(12) United States Patent
Linden et al.

(10) Patent No.: US 7,441,337 B2
(45) Date of Patent: Oct. 28, 2008

(54) PRUNING SHEARS OR CORRESPONDING CUTTERS

(75) Inventors: Olavi Linden, Billnas (FI); Markus Paloheimo, Helsinki (FI)

(73) Assignee: Fiskars Brands Finland OY AB, Billnas (FI)

( * ) Notice: Subject to any disclaimer, the term of this patent is extended or adjusted under 35 U.S.C. 154(b) by 245 days.

(21) Appl. No.: 11/067,584

(22) Filed: Feb. 26, 2005

(65) Prior Publication Data
US 2005/0188542 A1 Sep. 1, 2005

(51) Int. Cl.
B26B 13/00 (2006.01)
A47J 43/28 (2006.01)

(52) U.S. Cl. .............................. 30/238; 30/239; 30/249

(58) Field of Classification Search .................... 30/239, 30/257, 262, 228, 148, 238, 249–252, 254
See application file for complete search history.

(56) References Cited

U.S. PATENT DOCUMENTS

| | | | |
|---|---|---|---|
| 1,760,232 A | | 5/1930 | Finken |
| 2,503,783 A | * | 4/1950 | Ward et al. ..................... 81/367 |
| 4,359,821 A | * | 11/1982 | Pellenc ........................ 30/228 |
| 4,439,923 A | * | 4/1984 | Scranton ....................... 30/252 |
| 4,458,418 A | * | 7/1984 | McSmith et al. ............... 30/228 |
| 5,020,222 A | | 6/1991 | Gosselin et al. |
| 5,058,277 A | | 10/1991 | Kishimoto |
| 5,234,453 A | * | 8/1993 | Smith et al. .................. 606/170 |
| D344,218 S | | 2/1994 | Wensley et al. |
| D344,219 S | | 2/1994 | Wensley et al. |
| 5,315,762 A | * | 5/1994 | Dearman ...................... 30/231 |
| 5,325,591 A | * | 7/1994 | Orthey ........................ 30/252 |
| 5,511,314 A | * | 4/1996 | Huang ......................... 30/251 |
| 5,570,510 A | | 11/1996 | Lindén |
| 5,689,888 A | | 11/1997 | Lindén |

(Continued)

FOREIGN PATENT DOCUMENTS

DE 490 614 C 10/1930

(Continued)

OTHER PUBLICATIONS

European Search Report based on Application No. EP 05 10 1387, date of completion of Search Report May 17, 2005 (3 total pages).

(Continued)

*Primary Examiner*—Joseph J. Hail, III
*Assistant Examiner*—Alvin J Grant
(74) *Attorney, Agent, or Firm*—Foley & Lardner LLP

(57) ABSTRACT

Pruning shears or corresponding cutters comprising a first elongated handle part, a first blade part arranged as an extension of the first handle part, a second blade part pivoted to the first blade part from a first pivot point, and a second elongated handle part pivoted at its first end to the second blade part from a second pivot point. The second elongated handle part is connected to the first elongated handle part with at least one shaft pivotally connected to both the first and second elongated handle parts. The first and second elongated handle parts are arranged in the open position of the shears in remain along their entire length at a distance from each other enabling the use of the shears with one hand along the entire length of the handle parts.

22 Claims, 1 Drawing Sheet

Figure 1:
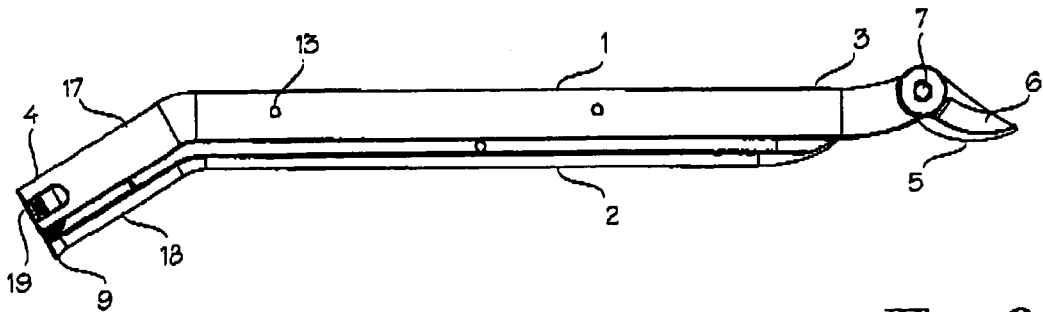

U.S. PATENT DOCUMENTS 5,697,159 A * 12/1997 Linden .................... 30/250
5,950,314 A * 9/1999 Chang .................... 30/244
6,513,248 B2 * 2/2003 Linden et al. ............ 30/251
6,571,479 B1 * 6/2003 Wu ........................ 30/248

FOREIGN PATENT DOCUMENTS

| DE | 509 855 C | 10/1930 |
|----|-----------|---------|
| DE | 932 207 | 8/1955 |
| FR | 2 569 521 A1 | 3/1986 |
| FR | 2 591 851 A1 | 6/1987 |
| GB | 323712 | 1/1930 |

OTHER PUBLICATIONS

The Finnish Search Report based on U.S. Appl. No. 20045059, Oct. 28, 2004 (2 pages).

* cited by examiner

PRUNING SHEARS OR CORRESPONDING CUTTERS

BACKGROUND OF THE INVENTION

The present Application claims the benefit of and priority as available under 35 USC §§ 119-21 to the following Finish Patent Application, hereby incorporated by reference: Finish Patent Application No. 20045059, titled "PRUNING SHEARS OR CORRESPONDING CUTTERS" filed Feb. 27, 2004.

The present invention relates to pruning shears or other corresponding cutters comprising a first elongated handle part having a first end and a second end, a first blade part arranged as an extension of the first handle part at its first end, a second blade part pivoted to the first blade part from a first pivot point for scissor-like movement relative to the first blade part between an open and closed position of the shears, and a second elongated handle part having a first end and a second end pivoted at its first end to the second blade part from a second pivot point, and at least one shaft with which the second elongated handle part is connected to the first elongated handle part and which is pivotally connected to both the first and second elongated handle parts from points located closer to the second end than the first end of the elongated handle parts.

Pruning shears are known for example from U.S. Pat. Nos. 5,570,510 and 6,513,248 and from FR patent 2,569,521. U.S. Pat. No. 6,513,248 discloses pruning shears intended to be used with one hand, i.e. so-called hand cutters suitable for cutting hedges or branches of smaller trees. Their range of use is limited primarily to cutting such branches that are easily accessible without special auxiliary tools, such as ladders or the like.

U.S. Pat. No. 5,570,510 discloses pruning shears or loppers having substantially longer handle parts than those of the pruning shears disclosed in U.S. Pat. No. 6,513,248. Accordingly, they enable the cutting of branches located somewhat farther or upper. They also comprise a gear mechanism for enhancing the shearing force of the shears, which makes them suitable also for cutting somewhat thicker branches. However, the handle parts that are quite long and open up to a relatively wide angle significantly complicate the use of these shears for denser branches. Said pruning shears are also intended to be used specifically with two hands. This also contributes to the difficulty of using these shears for cutting branches that are relatively high up or in the middle of bushes. Similar negative features are associated with the secateurs disclosed in FR patent 2,569,521. However, they comprise a shaft that includes a hydraulic cylinder and is arranged between the handle parts. Said hydraulic cylinder allows the shearing force of the secateurs to be intensified.

SUMMARY OF THE INVENTION

The object of the present invention is to provide pruning shears or other corresponding cutters that succeed in avoiding the problems associated with the above-described known pruning shears particularly in cutting branches in the middle or upper parts of bushes. This is achieved by means of the pruning shears or other corresponding cutters according to the invention, which are characterized in that the first and second elongated handle parts are arranged in the open position of the shears to remain along their entire length at a distance from each other that enables the use of the shears with one hand along the entire length of the handle parts.

Thus, in accordance with the invention, pruning shears or other corresponding cutters are provided that are suitable for use particularly when hand cutter do not reach or lack force and loppers are too large to perform the intended cutting. The pruning shears according to the invention are suitable for use equally well with both one hand and two hands along the entire length of the handle parts according to the cutting distance or shearing force required in each particular case.

In accordance with the invention, the first and second elongated handle parts are arranged in the open position of the shears to be at a distance from one another that enables the use of the shears with one hand along the entire length of the handle parts. This makes the shears extremely easy to use and versatile, since they can be used for cutting nearby branches, in which case the handle parts are gripped close to the blades, and for cutting branches that are farther away, in which case the handle parts are gripped at their second end. In addition to the shears being usable with one hand along the entire length of their handle part, the shears can also be used with two hands and similarly along the entire length of the handle part. Use with two hands naturally increases the available shearing force.

A particularly preferred structure is provided by an embodiment wherein the distance between the handle parts in the open position of the shears is smaller at the first end than at the second end of the handle parts. This way the end of the shears on the side of the blades can be made narrower and the cutting jaw of the shears can thus be introduced into a narrower space than would otherwise be the case. The structure also enables progressive change of the shearing force, i.e. the force increases towards the end of the cutting.

As is evident from the above, the above described mechanical structure of the pruning shears or other corresponding cutters according to the invention enables the length of the handle parts to be multiple, such as 3 to 10-fold, for example, relative to the distance between the handle parts when the shears are in the open position.

Furthermore, it is preferred for the first and second handle parts to comprise portions at their second end that are turned to an acute angle relative to the axial direction of the main part of the handle parts. The lengths of these turned portions of the first and second handle parts preferably correspond substantially to the distance between the first and second handle parts in the open position of the shears. Arranging a portion at the second end of the hand parts, the portion being turned to an acute angle relative to the rest of the length of the handle parts, provides a structure wherein a kind of pistol-like handle is formed in the shears. The shears can be used with one hand from this handle in such a manner that they constitute an extension of the cutter's hand, which also enables the cutting of branches that are relatively far.

In order for the structure of the handle parts not to be implemented very rigid, it is preferable to have the first and second handle part further interconnected with a shaft that is pivotally connected to both the first and the second handle part from points that are closer to the first end of the elongated shafts than the pivot points of said at least one shaft. Placing a second shaft between the handle parts enables more exact binding of the mutual travel path of the handle parts, and the handle parts can be better aligned relative to one another also when the handle parts have to be pressed relatively strongly in connection with the cutting.

In order for the use of the pruning shears or other corresponding cutters according to the invention to be swift and light, it is preferable to provide at least one of the shafts between the first and second handle parts with a spring that forces the first and second handle parts apart from one another towards the open position of the shears. In this way the pruning shears open automatically when the pressing of the handle parts is released and they are thus ready for a new cutting without any special measures.

LIST OF FIGURES

Figure 2:
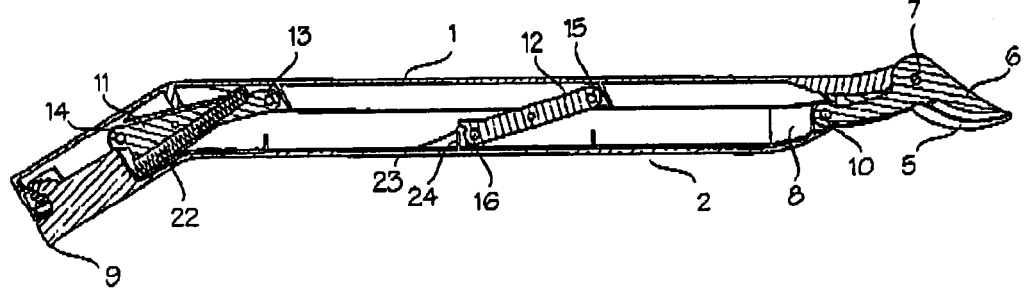
Figure 3:
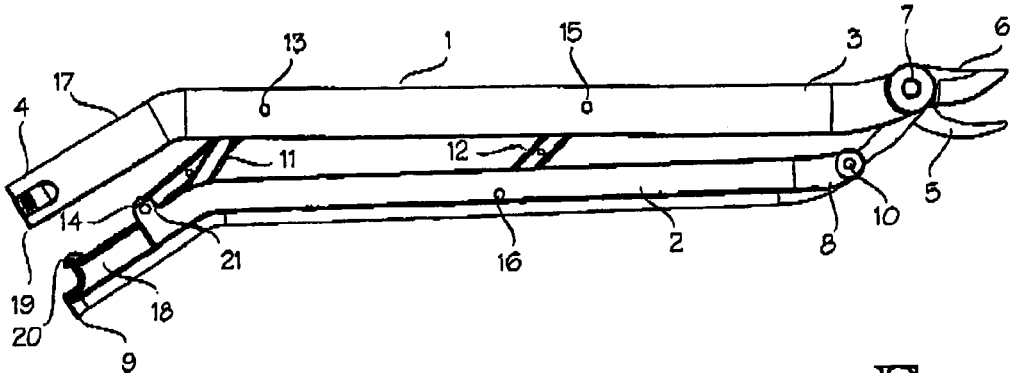
Figure 4:
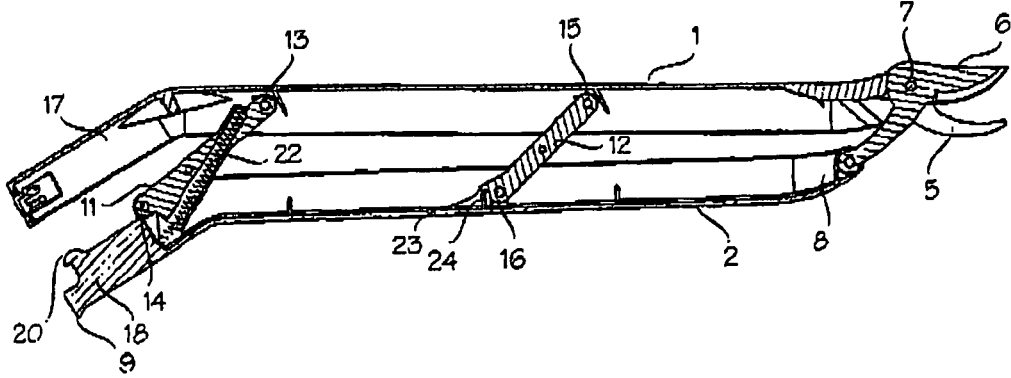

In the following, the pruning shears or other corresponding cutters according to the invention will be described in more detail with reference to the accompanying drawing, in which FIG. 1 shows the pruning shears or other corresponding cutters according to the invention in their closed position, FIG. 2 shows a cross-section of the pruning shears or other corresponding cutters of FIG. 1 along their longitudinal middle line, FIG. 3 shows the pruning shears or other corresponding cutters of FIG. 1 in their open position, and FIG. 4 shows a cross-section of the pruning shears or other corresponding cutters of FIG. 1 along their longitudinal middle line in their open position.

DETAILED DESCRIPTION OF THE INVENTION

FIGS. 1, 2 and 3, 4 show the pruning shears or other corresponding cutters according to the invention in their closed position and open position, respectively. Hereinafter, the pruning shears or other corresponding cutters according to the invention will be called shears for the sake of simplicity.

The shears according to the invention compose two elongated handle parts 1 and 2. A blade part 5 is attached to one end of the handle part 1 as an extension, the blade part constituting the lower jaw of the cutting jaw of the shears in the side views shown in FIGS. 1 to 4. This jaw 5 is somewhat arched, as is customary in pruning shears. A second blade part 6, movable in a scissor-like fashion relative to the blade part 5, is pivoted to said blade part 5 from a pivot point 7. In the side views shown in the figures, this blade part 6 constitutes the upper jaw of the cutting jaw. FIGS. 2 and 4, in particular, show that the blade part 6 is double acting such that on one side of the pivot point 7 it constitutes one jaw of said cutting jaw and on the other side a lever-like part, which is pushed to make the blade part 6 perform its scissor-like cutting movement relative to the blade part 5 around the pivot point 7.

The handle part 2 is joined from its first end 8 to the lever-like end of the blade part 6 with a joint 10. A shaft 11 pivoted with an axle journal 13 to the handle part 1 and with an axle journal 14 to a lug 21 provided in the handle part 2 is arranged between the second ends of the handle parts 1 and 2, i.e., between the ends 4 and 9, respectively, distal from the ends 3 and 8, respectively, of the handle parts provided with the blade parts. In principle, this manner is sufficient to provide shears wherein the length of the handle parts 1 and 2 may be relatively long, i.e. several tens of centimeters up to and even over a meter without the mutual maximal distance between the handle parts at any point along their length exceeding the distance enabling the use of the shears with only one hand, if needed. However, in order for the rigidity of the handle parts 1 and 2 not to have to be very long and, on the other hand, in order to control the handle parts more reliably in the desired manner when the shears am closed, a second shaft 12, pivoted relative to the handle parts 1 and 2 with axle journals 15 and 16, is also arranged between the handle parts 1 and 2.

As can be observed by studying the figures, the handle part 1 is made trough-like in a manner allowing the handle part 2 to partially extend into the handle part 1 when the shears are closed into the closed position according to FIGS. 1 and 2. By suitable dimensioning the lengths of the shafts 11 and 12 and, on the other hand, the angle they form relative to the handle part 1, the movement of the handle parts 1 and 2 is rendered smooth when the shears are closed, even if the handle parts 1 and 2 were somewhat farther from one another at the ends 4 and 9 distal to the blade parts 5 and 6 than at the ends on the side of the blade parts. Herein it is essential that the distances that the pivot points 14 and 16 move in the axial direction of the handle part 1 when the shears are dosed are equally long. Naturally, these distances shall be as long as the distance that the pivot point 10 moves in the axial direction of the handle part 1 when the shears are closed. In this way, the handle parts settle against each other evenly along their entire length when the shears are closed.

As is evident from FIGS. 3 and 4, the shafts 11 and 12 are dimensioned and oriented in such a manner that the distance between the handle parts 1 and 2 at the end on the side of the blades of the shears is somewhat shorter than at their other ends. There are several reasons for this procedure. Firstly, in this manner, the end of the shears on the side of the blades can be made narrower and the cutting jaw of the shears can thus be inserted into a narrower space than would otherwise be the case. In the open position of the shears, the shaft 11 is arranged to form a smaller angle relative to the handle part 1 than the one formed by the shaft 12 relative to the handle part 1. This, in turn, means that be shaft 11 moves at a smaller angle relative to the handle part 1 when the shears are opened and closed. This achieves progressiveness in the shearing force, i.e. the force increases towards the end of the cutting. If the handle parts 1 and 2 were parallel during the entire operation of the shears, i.e. the front end of the shears were as broad as the rear end, the above-mentioned advantages would not be achieved. The front end of the shears would become either unnecessarily high, which would complicate the use of the shears in congested places, or the rear end unnecessarily low, which would prevent the utilization of the maximal distance or working travel of the handle parts enabled by the use of one hand. In addition, the progressive increase in the shearing force at the end of the cutting would be lesser.

In order to make the shears automatically return to their open position after a shearing movement in the embodiment shown in the figures a compression spring 22 is arranged in connection with the shaft 11, as is evident from FIGS. 2 and 4. The spring 22 is embedded obliquely inside the shaft 11. The spring 22 tends to force the handle parts 1 and 2 apart from one another, i.e. to open the shears into the position shown in FIGS. 3 and 4. Placement of the spring 22 inside the shaft 11 ensures that the spring remains in position and also protects it from external damage and soiling. Spring loading could also be implemented in another manner, such as for instance by placing a suitable coil spring in connection with the pivot point 13, 15, or both.

In the embodiment of the invention shown in the figures, the maximum opening angle of the shears into the open position shown in FIGS. 3 and 4 is limited by the formation of a limiter cam 23 at the end of the shaft 12 on the side of the handle part 2. When the shears open, this cam 23 settles in the desired maximum opening position against a stiffening rib 24 in the handle part 2 thus preventing the shaft 12 from rotating more relative to the pivot point 16. A similar limiter structure could be implemented also in connection with the end of any other shaft 11 or 12.

To maximize the usability of the shears according to the invention, portions 17 and 18 are provided at the ends of the handle parts 1 and 2 facing away from the blade parts 5 and 6, the portions generating an acute angle relative to the axial direction of the handle parts 1 and 2. In this way, a pistol-like handle is provided in the shears and it enables easy use of the shears also when the shears serve as an extension to the user's extended arm. The length of these portions 17 and 18 is preferably selected equal to the width of the palm of the hand or approximately equal to the distance between the handle parts 1 and 2 in the open position of the shears at the end on the side of said portions 17 and 18.

For locking the shears into the closed position according to FIGS. 1 and 2, the ends 4 and 9 of the handle parts 1 and 2 located away from the blade parts 5 and 6 are provided with a locking mechanism. This locking mechanism is composed of a latch part 19 connected to the handle part 1 and a looking cam 20 connected to the handle part 2. The latch part has two stable positions, i.e. a position wherein it locks the handle parts into a locked position, and a position wherein it lets the handle parts open. The latch part 19 is arranged at the end 4 of the handle part 1. The locking cam 20, in turn, is connected to the handle part 2 and is placed in the vicinity of its end 9. When the handle parts 1 and 2 are pressed against each other and the latch part 19 is moved into the locking position, it settles behind the locking cam 20 thus locking the shears into the closed position according to FIGS. 1 and 2.

The pruning shears or other corresponding cutters according to the invention were described above by means of one exemplary embodiment only and it is evident that several, particularly design-related changes can be made therein without however, deviating from the scope of protection defined in the attached claims. Accordingly, for instance the position and structure of the locking mechanism can be changed relatively easily without it affecting the operation of the shears in any manner. Similarly, the position and structure of the opening spring and the position and structure of the parts limiting the opening angle can be easily modified, as was stated above.

The invention claimed is:

1. Pruning shears or other corresponding cutters comprising:
   a first elongated handle part having a first end and a second end,
   a first blade part arranged as an extension of the first handle part at its first end,
   a second blade part pivoted to the first blade part from a first pivot point for scissor-like movement relative to the first blade part between an open and closed position of the shears,
   a second elongated handle part having a first end and a second end pivoted at its first end to the second blade part from a second pivot point, and
   a first shaft pivotally connected to both the first and second elongated handle parts from points located closer to the second end than the first end of the elongated handle parts;
   a second shaft pivotally connected to both the first and the second handle parts from points that are closer to the first end of the elongated shafts than the pivot points of said at least one shaft:
   wherein the first and second elongated handle parts are arranged in the open position of the shears to remain along their entire length at a distance from each other that enables the use of the shears with one hand along the entire length of the handle parts.

2. Pruning shears or corresponding cutters as claimed in claim 1, wherein the distance between the handle parts in the open position of the shears is shorter at the first end than at the second end of the handle parts.

3. Pruning shears or corresponding cutters as claimed in claim 1, wherein the length of the first and second handle parts is multiple, such as 3 to 10-fold, relative to the distance between the handle parts in the open position of the shears.

4. Pruning shears or corresponding cutters as claimed in claim 1, wherein the second end of the first and second handle parts is provided with portions turned to an acute angle relative to the axial direction of the main part of the handle parts and wherein the lengths of the turned portions of the first and second handle parts substantially correspond to the distance between the first and second handle parts in the open position of the shears.

5. Pruning shears or corresponding cutters as claimed in claim 1, further comprising a locking mechanism arranged in connection with the second ends of the first and second handle parts for locking the shears into their closed position.

6. Pruning shears or corresponding cutters as claimed in claim 5, wherein the locking mechanism comprises a locking cam connected to the second handle part and a latch part that has two stable positions and is connected to the first handle part and positioned in its second stable position behind the locking cam when the shears are closed for locking the shears into their closed position.

7. Pruning shears or corresponding cutters as claimed in claim 1, wherein at least one of the first shaft and the second shaft between the first and second handle parts is provided with a spring that forces the first and second handle parts apart from each other towards the open position of the shears.

8. A cutting device, comprising:
   a first handle having a first end and a second end;
   a second handle having a first end and a second end;
   a first blade member extending from the first end of the first handle;
   a second blade member having a blade portion and a lever portion, the lever portion pivotally coupled to the first end of the first handle and the first end of the second handle for movement of the blade portion in a shearing relationship with the first blade member between an open position and a closed position; and
   at least one shaft pivotally coupled to the first handle and the second handle;
   wherein the first handle comprises a trough portion configured to at least partially receive the second handle when the first blade member and the second blade member are in the closed position.

9. The cutting device of claim 8 wherein the first handle, the second handle, the lever portion and the shaft form a four-bar linkage assembly.

10. The cutting device of claim 8 wherein the at least one shaft comprises a first shaft pivotally coupled to the first handle and the second handle proximate the second end, and a second shaft pivotally coupled to the first handle and the second handle intermediate of the first end and the second end.

11. The cutting device of claim 10 wherein the first shaft is longer than the second shaft.

12. A pruner, comprising:
   a first handle having a first end and a second end;
   a second handle having a first end and a second end;
   a first blade member extending from the first end of the first handle;
   a second blade member having a blade portion and a lever portion, the lever portion pivotally coupled to the first handle and the second handle for movement of the blade portion in a shearing relationship with the first blade member between an open position and a closed position; and
   a first shaft pivotally interconnecting the first handle and the second handle to form a four-bar linkage with the lever portion so that the first handle and the second handle are substantially parallel when the first blade member and the second blade member are in the closed position and the first handle and the second handle are angled with respect to one another when the first blade member and the second blade member are in the open position.

13. The pruner of claim 12 further comprising a second shaft pivotally interconnecting the first handle and the second handle and positioned between the first shaft and the lever portion.

14. The pruner of claim 12 further comprising a spring cooperating with two or more of the first handle, the second handle, the lever portion and the first shaft to bias the first and second handles and the first and second blade members toward the open position.

15. The pruner of claim 12 wherein the second end of the first and second handles extend at an angle to form a hand grip portion.

16. The pruner of claim 12 further comprising a locking mechanism having a latch coupled to one of the first handle and the second handle and a cam connected to the other of the first handle and the second handle.

17. Pruning shears or other corresponding cutters comprising:
   a first elongated handle part having a first end and a second end,
   a first blade part arranged as an extension of the first handle part at its first end,
   a second blade part pivoted to the first blade part from a first pivot point for scissor-like movement relative to the first blade part between an open and closed position of the shears,
   a second elongated handle part having a first end and a second end pivoted at its first end to the second blade part from a second pivot point, and
   at least one shaft with which the second elongated handle part is connected to the first elongated handle part and which is pivotally connected to both the first and second elongated handle parts from points located closer to the second end than the first end of the elongated handle parts;
   wherein the first and second elongated handle parts are arranged in the open position of the shears to remain along their entire length at a distance from each other that enables the use of the shears with one hand along the entire length of the handle parts; and
   wherein the first and second handle parts are further interconnected with a second shaft pivotally connected to both the first and the second handle parts from points that are closer to the first end of the elongated shafts than the pivot points of said at least one shaft.

18. Pruning shears or corresponding cutters as claimed in claim 17, wherein at least one of the shafts between the first and second handle parts is provided with a spring that forces the first and second handle parts apart from each other towards the open position of the shears.

19. Pruning shears or other corresponding cutters comprising:
   a first elongated handle part having a first end and a second end,
   a first blade part arranged as an extension of the first handle part at its first end,
   a second blade part pivoted to the first blade part from a first pivot point for scissor-like movement relative to the first blade part between an open and closed position,
   a second elongated handle part having a first end and a second end pivoted at its first end to the second blade part from a second pivot point, and
   at least one shaft pivotally connected to both the first and second elongated handle parts from points located closer to the second end than the first end of the elongated handle parts;
   a locking mechanism arranged in connection with the second ends of the first and second handle parts for locking the shears into their closed position;
   wherein the first and second elongated handle parts are arranged in the open position of the shears to remain along their entire length at a distance from each other that enables the use of the shears with one hand along the entire length of the handle parts.

20. Pruning shears or corresponding cutters as claimed in claim 19, wherein the first and second handle parts are further interconnected with a second shaft pivotally connected to both the first and the second handle parts from points that are closer to the first end of the elongated shafts than the pivot points of said at least one shaft.

21. Pruning shears or other corresponding cutters comprising:
   a first elongated handle part having a first end and a second end,
   a first blade part arranged as an extension of the first handle part at its first end,
   a second blade part pivoted to the first blade part from a first pivot point for scissor-like movement relative to the first blade part between an open and closed position,
   a second elongated handle part having a first end and a second end pivoted at its first end to the second blade part from a second pivot point, and
   at least one shaft pivotally connected to both the first and second elongated handle parts from points located closer to the second end than the first end of the elongated handle parts;
   a spring that forces the first and second handle parts apart from each other towards the open position;
   wherein the first and second elongated handle parts are arranged in the open position of the shears to remain along their entire length at a distance from each other that enables the use of the shears with one hand along the entire length of the handle parts.

22. Pruning shears or corresponding cutters as claimed in claim 21, wherein the second end of the first and second handle parts is provided with portions turned to an acute angle relative to the axial direction of the main part of the handle parts and wherein the lengths of the turned portions of the first and second handle parts substantially correspond to the distance between the first and second handle parts in the open position of the shears.

* * * * *